United States Patent
Gubbini et al.

(10) Patent No.: US 6,550,632 B2
(45) Date of Patent: Apr. 22, 2003

(54) VENDING APPARATUS FOR DISPENSING HOT PIZZAS

(75) Inventors: Amulio Gubbini, Rosta (IT); Giovanni Demaggio, Rosta (IT)

(73) Assignee: Top Vending SrL, Turin (IT)

(*) Notice: Subject to any disclaimer, the term of this patent is extended or adjusted under 35 U.S.C. 154(b) by 66 days.

(21) Appl. No.: 09/726,509

(22) Filed: Dec. 1, 2000

(65) Prior Publication Data

US 2001/0002674 A1 Jun. 7, 2001

(30) Foreign Application Priority Data

Dec. 3, 1999 (IT) .................................. TO99A1068

(51) Int. Cl.$^7$ ................................................ G07F 11/00
(52) U.S. Cl. .................................... 221/13; 221/150 HC
(58) Field of Search ................... 221/150 HC, 150 R, 221/13, 262, 1, 7; 99/326; 206/545; 220/4.21

(56) References Cited

U.S. PATENT DOCUMENTS

| 4,848,543 A | * | 7/1989 | Doboze | 220/339 |
| 4,878,765 A | * | 11/1989 | Watkins et al. | 383/116 |
| 5,352,465 A | * | 10/1994 | Gonbek et al. | 426/87 |
| 5,472,139 A | * | 12/1995 | Valdman et al. | 229/407 |

* cited by examiner

Primary Examiner—Kenneth W. Noland
(74) Attorney, Agent, or Firm—Sughrue Mion, PLLC

(57) ABSTRACT

A vending apparatus for dispensing pre-cooked pizzas (P) packaged inside corresponding sealed containers (E). The apparatus comprises a casing (1) containing a plurality of operating assemblies (7, 13, 17, 25, 31, 37) for picking up a pizza (P) from a refrigerated storage unit (5) and transferring it, after taking it out of its container (E), to an electric heating oven (30), and then to a delivery mouth (34), in a corresponding disposable tray (T).

17 Claims, 12 Drawing Sheets

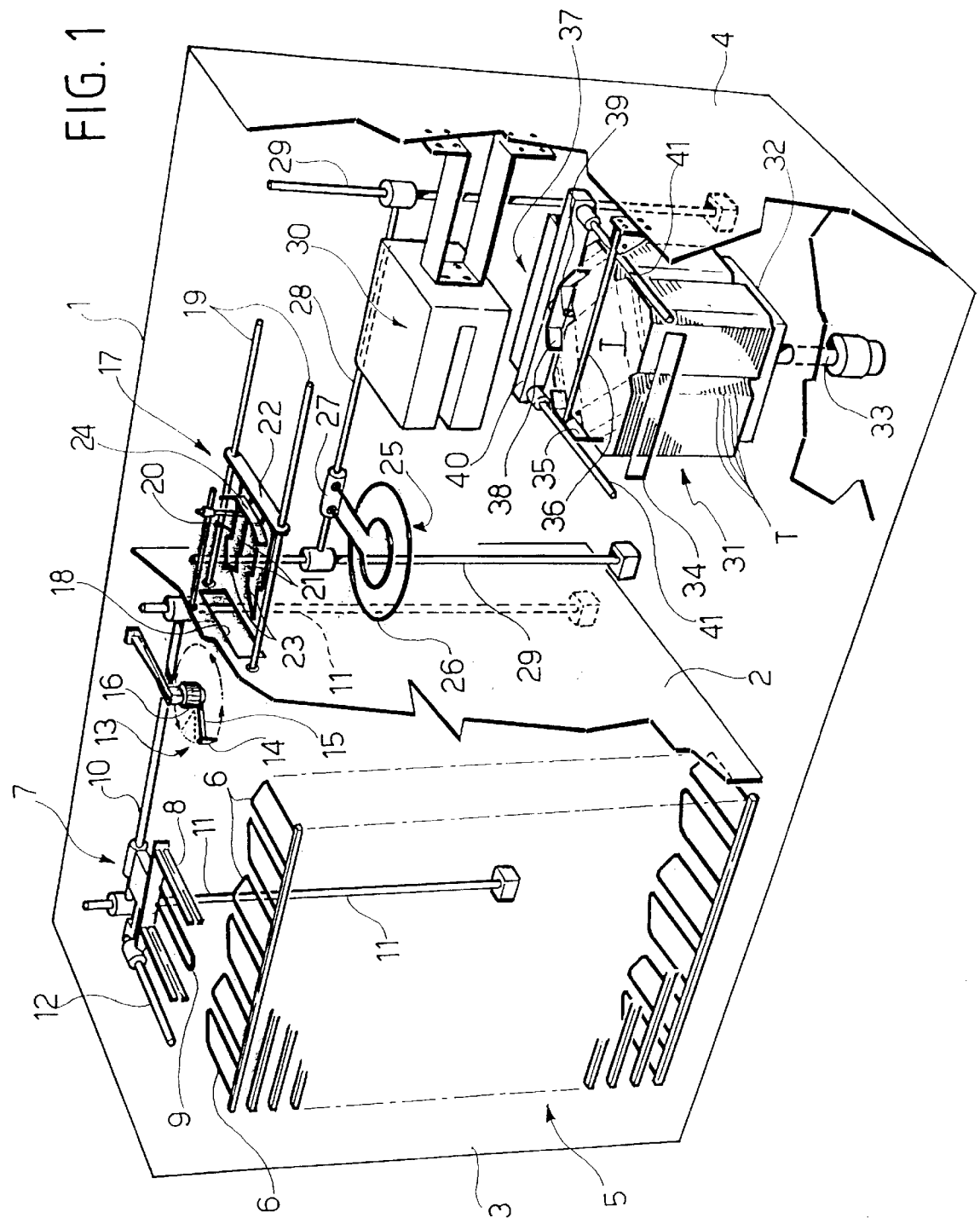

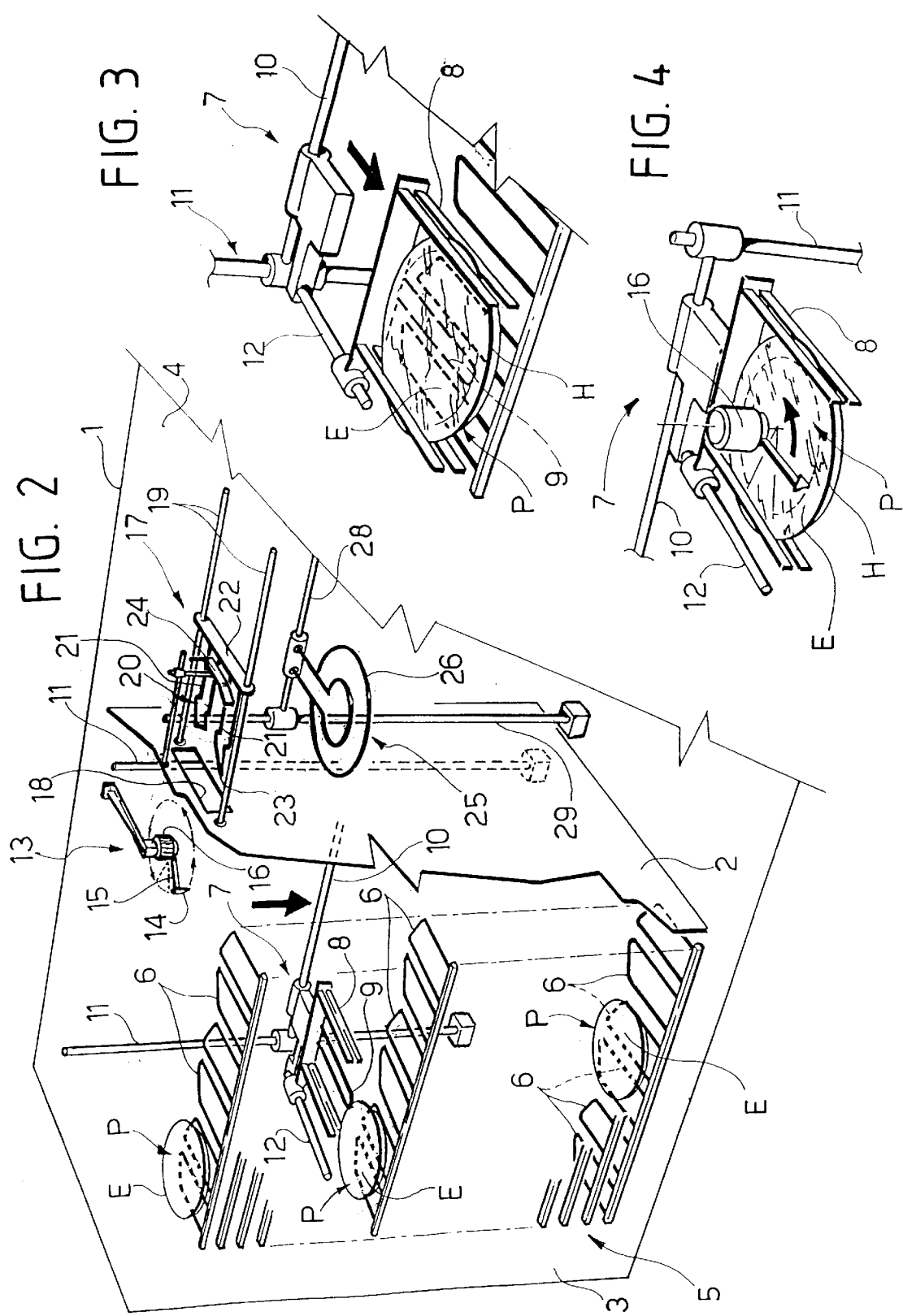

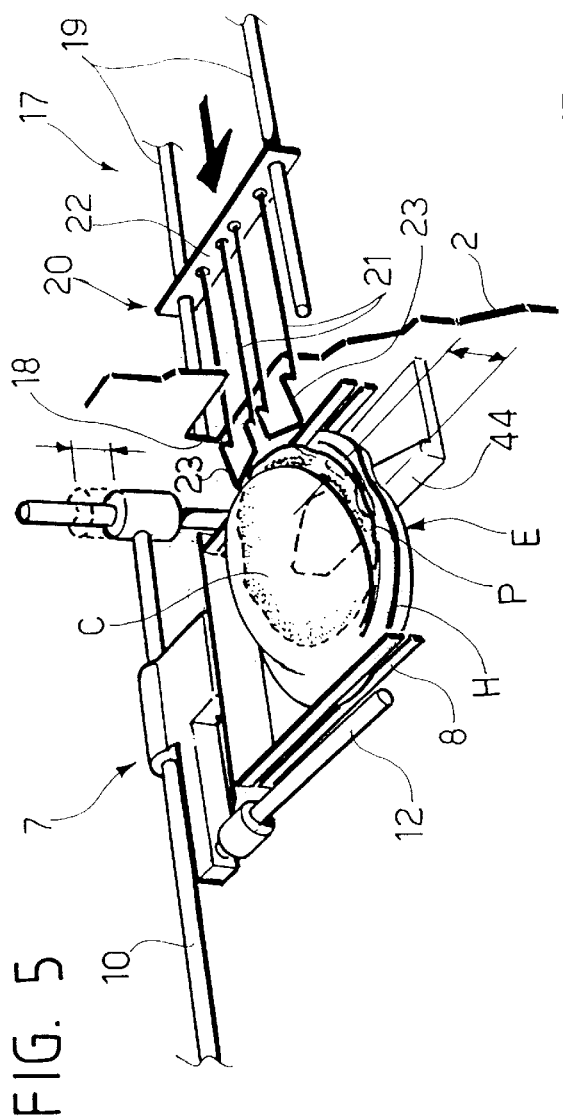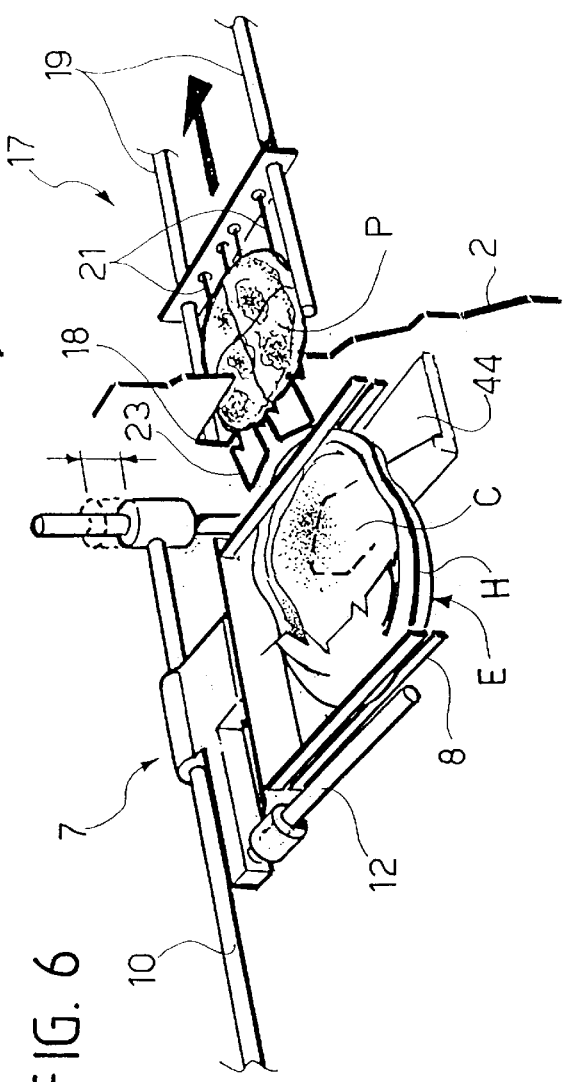

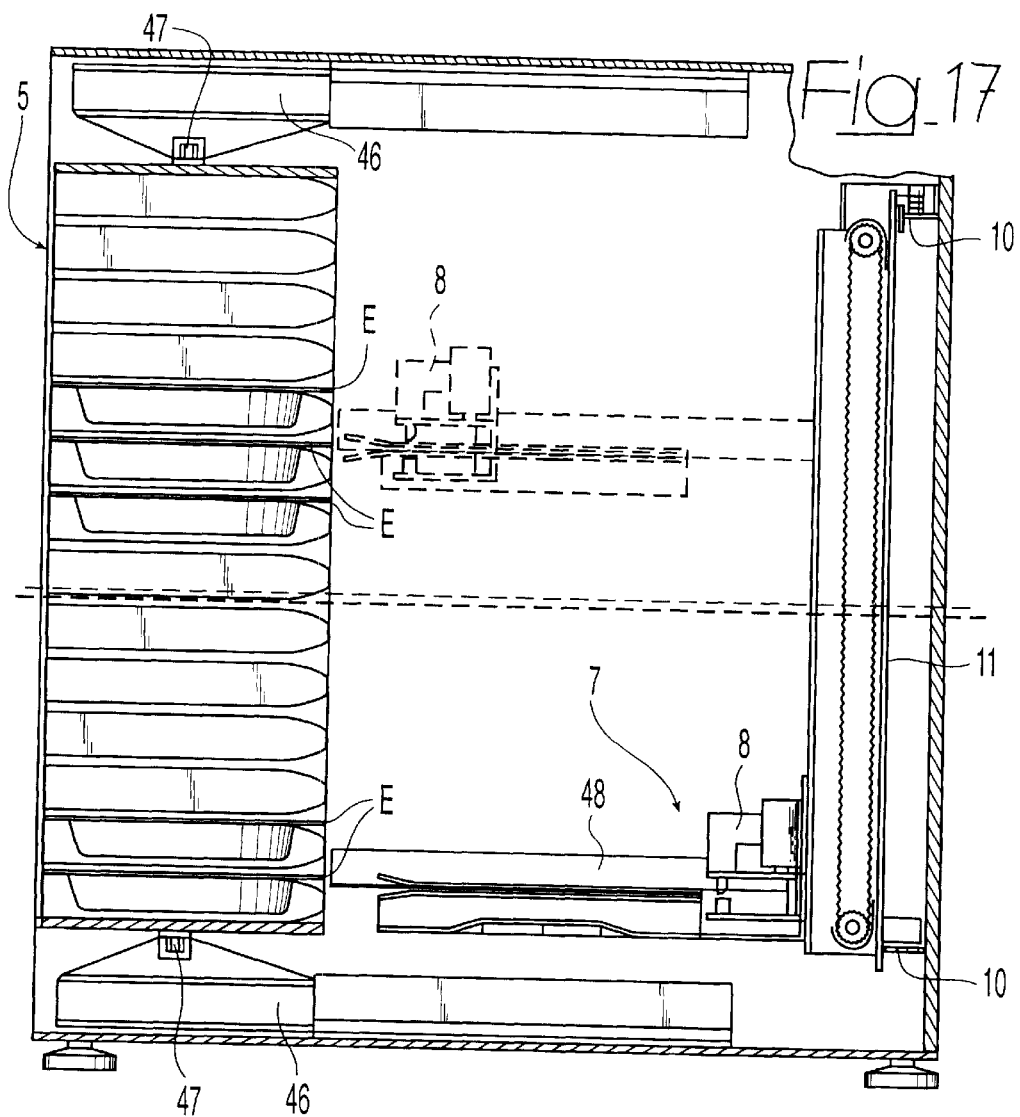
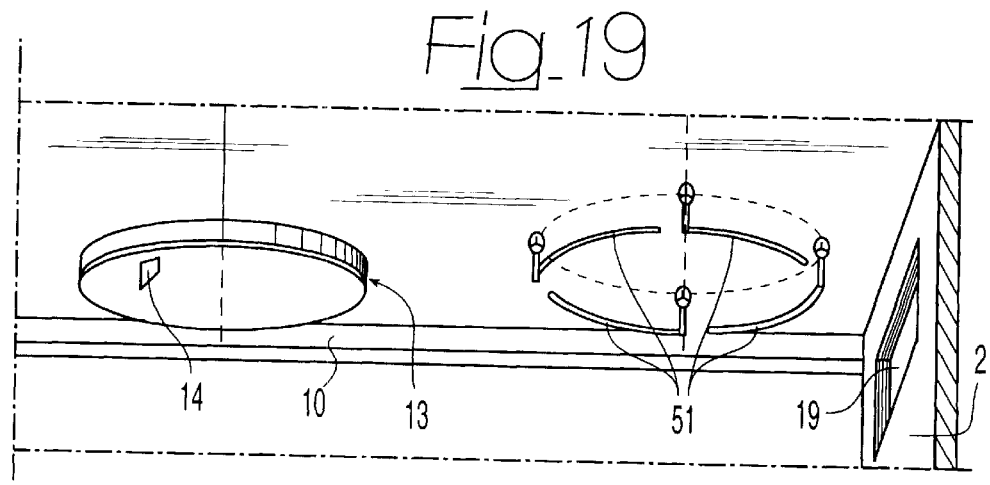

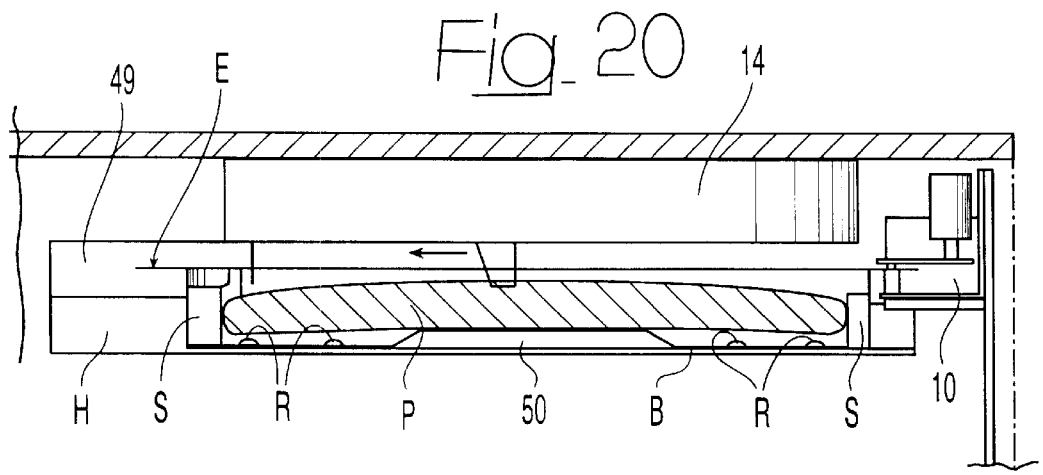
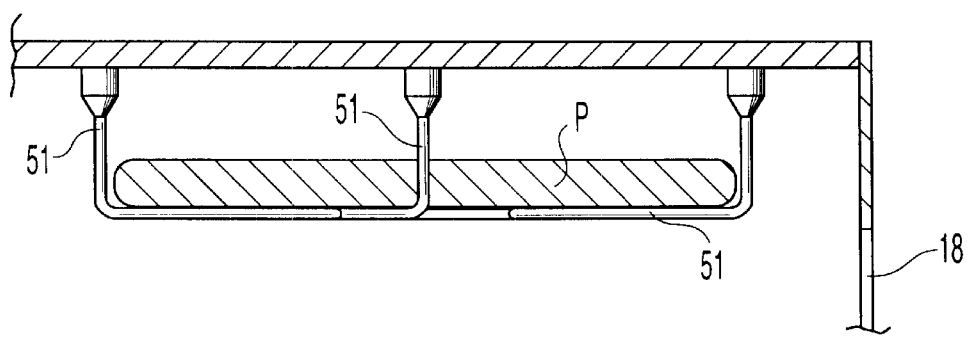
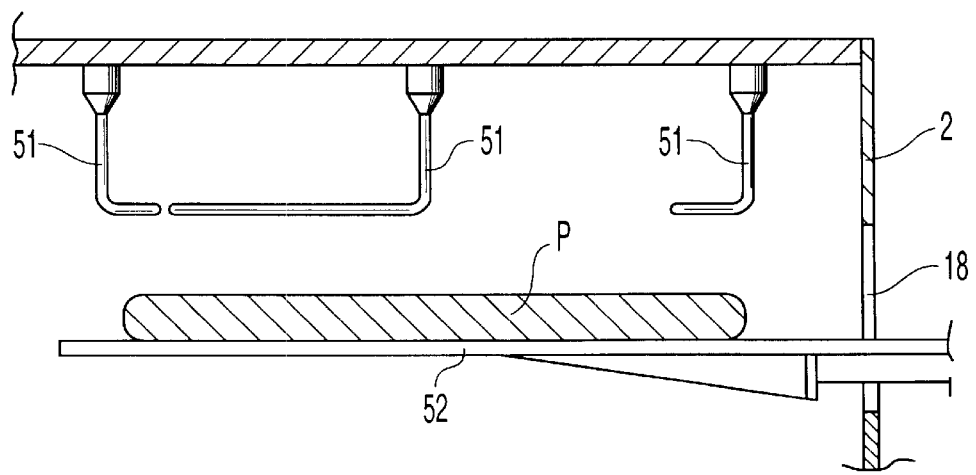

VENDING APPARATUS FOR DISPENSING HOT PIZZAS

FIELD OF THE INVENTION

The present invention relates to a vending apparatus for dispensing foodstuffs, in particular hot pizzas.

SUMMARY OF THE INVENTION

The object of the present invention is to make available a functional and reliable apparatus that enables, in an extremely short period of time, delivery, to the user that has requested it, of a hot pizza the quality of which, in terms of taste and fragrance, is comparable to that of a pizza made in a pizzeria.

In accordance with the present invention, the above object is achieved by providing a dispensing apparatus basically characterized in that it comprises a casing divided into a refrigerated section and a heating section, separated from one and intercommunicating with each other. The refrigerated section includes:

- a storage unit arranged for containing a plurality of pre-cooked pizzas, each of which is packaged in a respective sealed container;
- pick-up means for removing one pizza at a time from said storage unit by gripping the corresponding container peripherally;
- opening means to open the container;
- transfer means for taking the pizza out of the container.

The said heating section includes:

- an electric oven;
- a magazine of stacked disposable trays;
- movable supporting means designed for receiving the pizza from said transfer means, transferring it to the heating section and introducing it into the oven, and for depositing the heated pizza on the tray set at the top of the tray magazine; and
- delivery means for transferring the pizza onto the corresponding tray outside the container.

The apparatus further includes motor-driven actuator means and control means, which can be activated from outside the casing, normally by means of a slot-machine device or a device for introducing and validating banknotes, and which are provided for controlling the pick-up means, the opening means, the transfer means, the movable supporting means, and the delivery means synchronously according to a pre-set automatic cycle.

BRIEF DESCRIPTION OF THE DRAWINGS

Further characteristics and advantages of the present invention will emerge clearly in the course of the ensuing detailed description, which is provided purely to furnish non-limiting examples, with reference to the attached drawings, in which:

FIG. 1 is a schematic perspective and partially broken view of a vending apparatus for dispensing hot pizzas according to the invention;

FIG. 2 is a partial view of FIG. 1 which shows a first step in the process of delivery of a pizza;

FIGS. 3–11 are perspective views at a larger scale showing in detail the various components of the apparatus during the successive steps of the process of delivery of a pizza;

FIG. 17 is a partial and schematic view in vertical cross section according to the line XVII—XVII of FIG. 15;

FIG. 19 is a perspective, schematic and simplified view of another detail of the dispensing apparatus according to the variant of FIG. 15;

FIGS. 20 and 21 are two side elevations, partially sectioned and at a larger scale, which show two successive steps of operation of the apparatus according to the variant of FIG. 15;

FIGS. 23 and 24 are two views that are similar to FIGS. 20 and 21 which illustrate two successive steps of operation of the dispensing apparatus according to the variant of FIG. 15.

DETAILED DESCRIPTION OF EMBODIMENTS OF THE INVENTION

Figure 7:
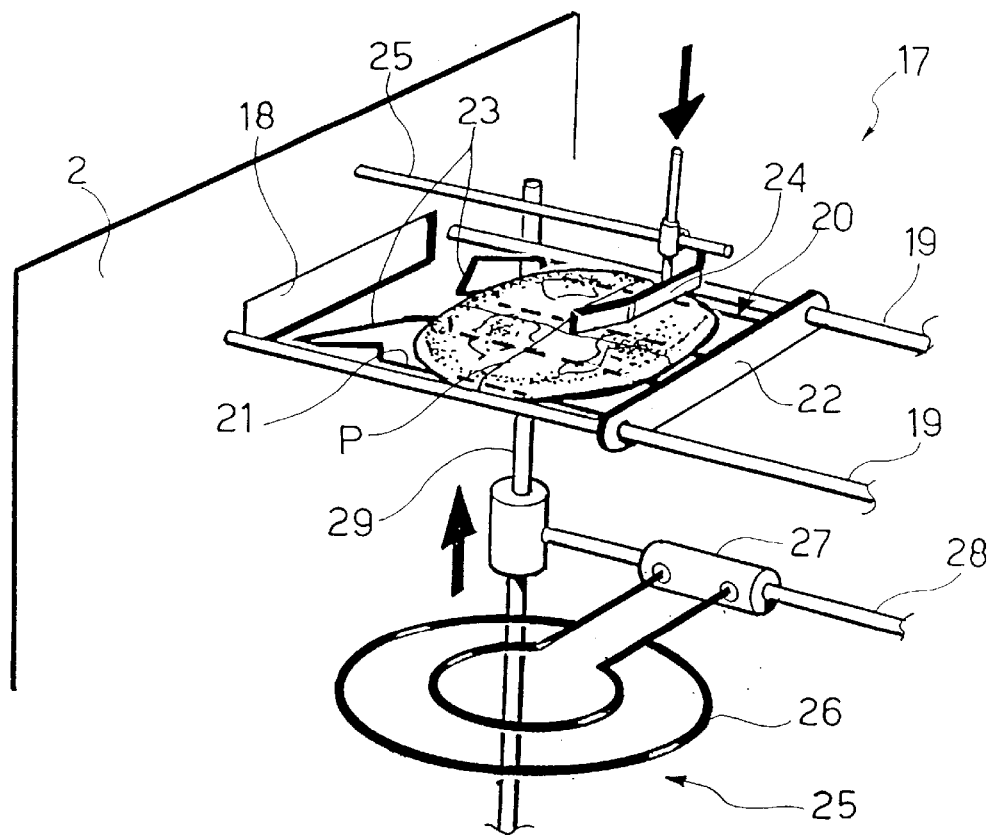

One first embodiment of the invention will now be described with reference to FIGS. 1–14. With reference first to FIG. 1, the vending apparatus according to the invention basically comprises a casing 1 divided by an intermediate vertical diaphragm or partition 2 into a refrigerated section 3 and a heating section 4.

The section 3 has a general refrigerated-storage-cabinet structure with a conventional refrigerating unit (not illustrated in detail for reasons of simplicity). Set inside the section 3 is a storage unit 5, formed, in the example illustrated, by three columns, set side by side, of double shelves 6 set on top of one another and on each of which there rests a respective pizza P (FIG. 2 et seq.).

Figure 13:
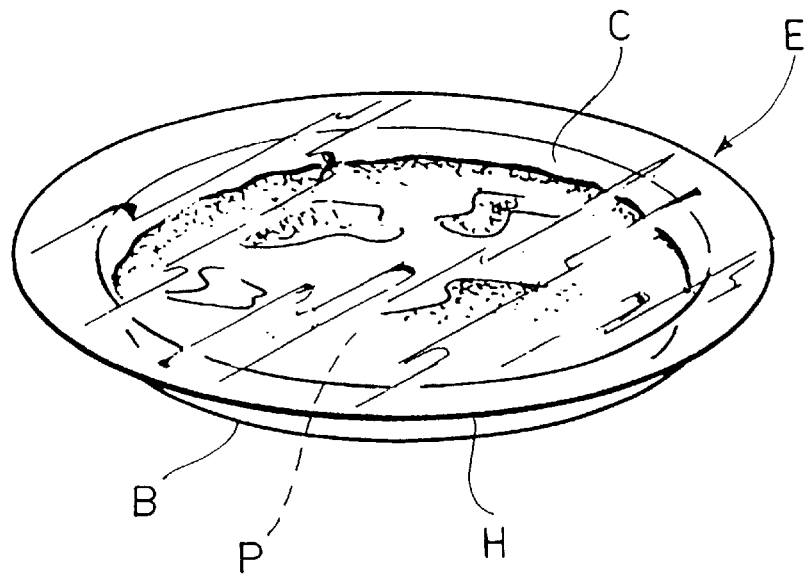
FIG. 13 is a perspective view at a larger scale showing the pizza as this is packaged at the start of the delivery process.

In particular, as illustrated in FIG. 13, each pizza P, pre-cooked and conveniently partially pre-cut according to two mutually orthogonal diametral lines, is packaged inside a sealed container E having the general shape of a circular tray with a bottom B, a lid C, and a projecting rim H.

With reference again to FIG. 1, operatively associated to the storage unit 5 is a pick-up assembly, generically designated by 7, including an openable and closeable gripping member 8 actuated by means of a motor-driven actuator (not shown), further provided with a bottom supporting bracket 9, and displaceable in a guided way, by means of a pair of motor-driven actuators (not illustrated either), according to three mutually orthogonal directions. More in particular, the gripping member 8 may be displaced along a top horizontal guide 10, in front of and parallel to the storage unit 5, and the guide 10 may be displaced vertically along a pair of vertical guides 11. Furthermore, the gripping member 8 may be displaced horizontally in a direction orthogonal to the storage unit 5, along a lateral guide 12.

In this way, the gripping member 8 of the pick-up assembly 7 is able to set itself in a position corresponding to one of the shelves 6, selected automatically according to what is explained in what follows, and to pick up—according to the modalities described hereinafter—the pizza P laid on the said shelf 6 inside the corresponding sealed container E.

The reference number 13 designates an opening assembly positioned within the refrigerated section 3 and having the function of opening the container E of the pizza P as the latter is taken out of the storage unit 5 by means of the pick-up assembly 7. The opening assembly 13 basically comprises a vertical knife 14 carried by a horizontal arm 15 which can be displaced, with rotary motion, by means of a motor 16, about a vertical axis according to the path indicated by the arrows of FIGS. 1 and 2. The modalities with which the knife 14 carries out opening of the sealed container E will be clarified in what follows.

The reference number 17 designates a transfer assembly, the function of which is to take the pizza P out of the corresponding container E, following upon the opening operation performed by the assembly 13, and to transfer the pizza to the heating section 4. In actual fact, the transfer assembly 17, albeit mostly housed inside the heating section 4, serves as an intermediary between the said heating section 4 and the refrigerated section 3 through a window-like opening 18 which is provided in the top part of the intermediate partition 2 and is normally closed by means of an openable communicating door (not illustrated in the drawings), also the latter being conveniently operated by a motor-driven actuator.

Set underneath the windows 18 is a stationary contrast element 44 which is roughly wedge-shaped and the function of which will be clarified later on.

The transfer assembly 17 comprises a pair of horizontal guides 19, which are aligned with the window 18 and along which a pizza shovel 20 may be displaced by means of a motor-driven actuator (not illustrated). As is shown in greater detail in FIGS. 5 and 6, the movable shovel 20 is made up of two prongs or arms 21 which project in cantilever fashion from a supporting cross member 22 and the free ends 23 of which present an ascending-descending pattern for the reasons clarified in what follows.

Figure 8:
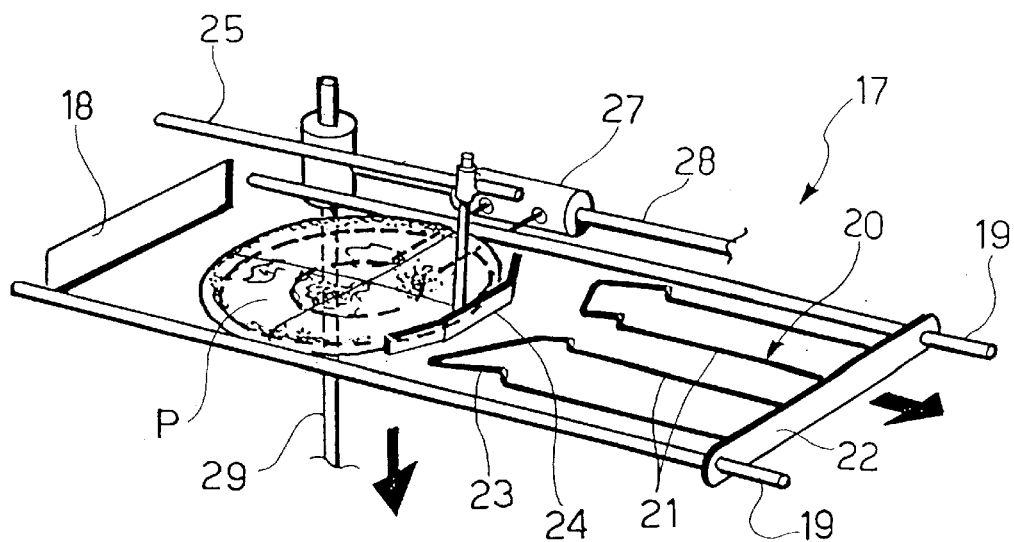

Operatively associated to the shovel 20 is a movable contrast element 24, which is illustrated in greater detail in FIGS. 7 and 8. The said movable contrast element 24 is carried in cantilever fashion by the intermediate diaphragm 2, by means of a supporting rod 25, and may be vertically displaced by means of a motor-driven actuator (not illustrated), according to the modalities and for the purposes clarified in what follows.

In a position underneath the transfer assembly 17, inside the heating section 4, is set a movable supporting device 25 the function of which is to receive the pizza P from the transfer assembly 17 to proceed to its heating prior to its delivery outside the dispensing apparatus 1. In detail, the movable supporting device 25 comprises a horizontal grill or grating 26, which is conveniently of a circular annular shape and is carried, in cantilever fashion, by a slider 27 which can move along a horizontal guide 28. The horizontal guide 28 is in turn vertically movable along two vertical guides 29. The displacements of the grill 26 in the horizontal direction along the guide 28 and in the vertical direction along the guides 29 are controlled by means of respective motor-driven actuators (not illustrated in the drawings).

The reference number 30 designates an electric oven designed to heat, in a very short time, the pizza as this is rested on the grill 26 and inserted by the latter inside the oven. The oven 30 is conveniently of the IR microwave type, with radiating elements set both at the bottom and at the top, i.e., both underneath the grill 26 and above it when the said grill is introduced with the pizza inside the oven 30.

The reference number 31 designates a magazine of disposable trays T, set stacked in a position underneath the heating oven 30. The said magazine 31 comprises a horizontal supporting base 32 which carries the pile of trays T and which can be raised, by means of a motor-driven column 33, in such a way as to position the tray T that is set on the top of the column in a position corresponding to an output mouth 34 through which the pizzas come out of the casing 1.

The magazine 31 moreover includes a movable contrast element 35 carried by an oscillating rod 36, which is operated by a motor-driven actuator (not illustrated), and set immediately above the tray T located at the top of the column.

The reference number 37 designates a delivery assembly the function of which is to transfer the pizza P, as this deposited on the top tray T, outside the dispensing apparatus 1, through the mouth 34, along with the corresponding tray T. As is illustrated in detail also in FIG. 12, the delivery assembly 37 comprises a pizza pusher 38 which has associated to it a dish-pushing member 39, both of which are carried by a cross member 40 that can be displaced along a pair of horizontal guides 41 towards the delivery mouth 34, and vice versa, by means of a motor-driven actuator (not illustrated).

Figure 12:
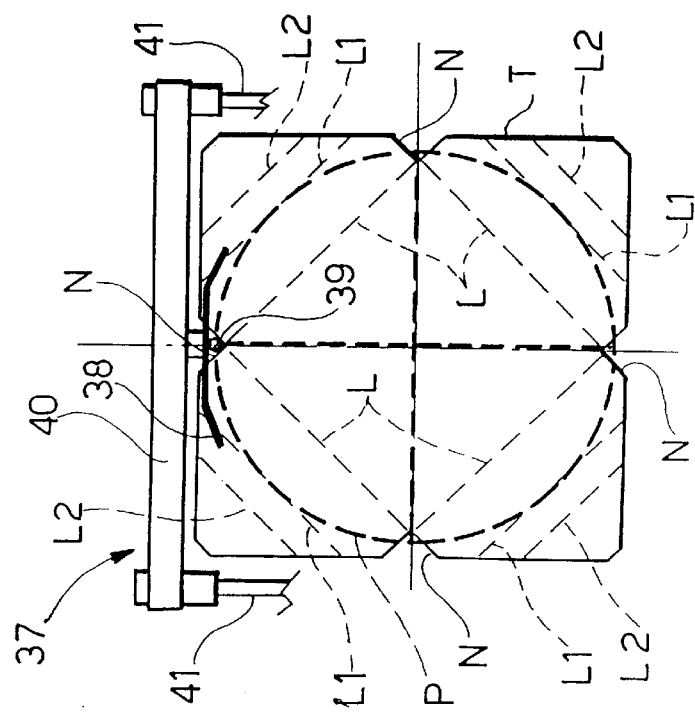
FIG. 12 is a top plan view at a larger scale according to the arrow XII of FIG. 11.
Figure 9:
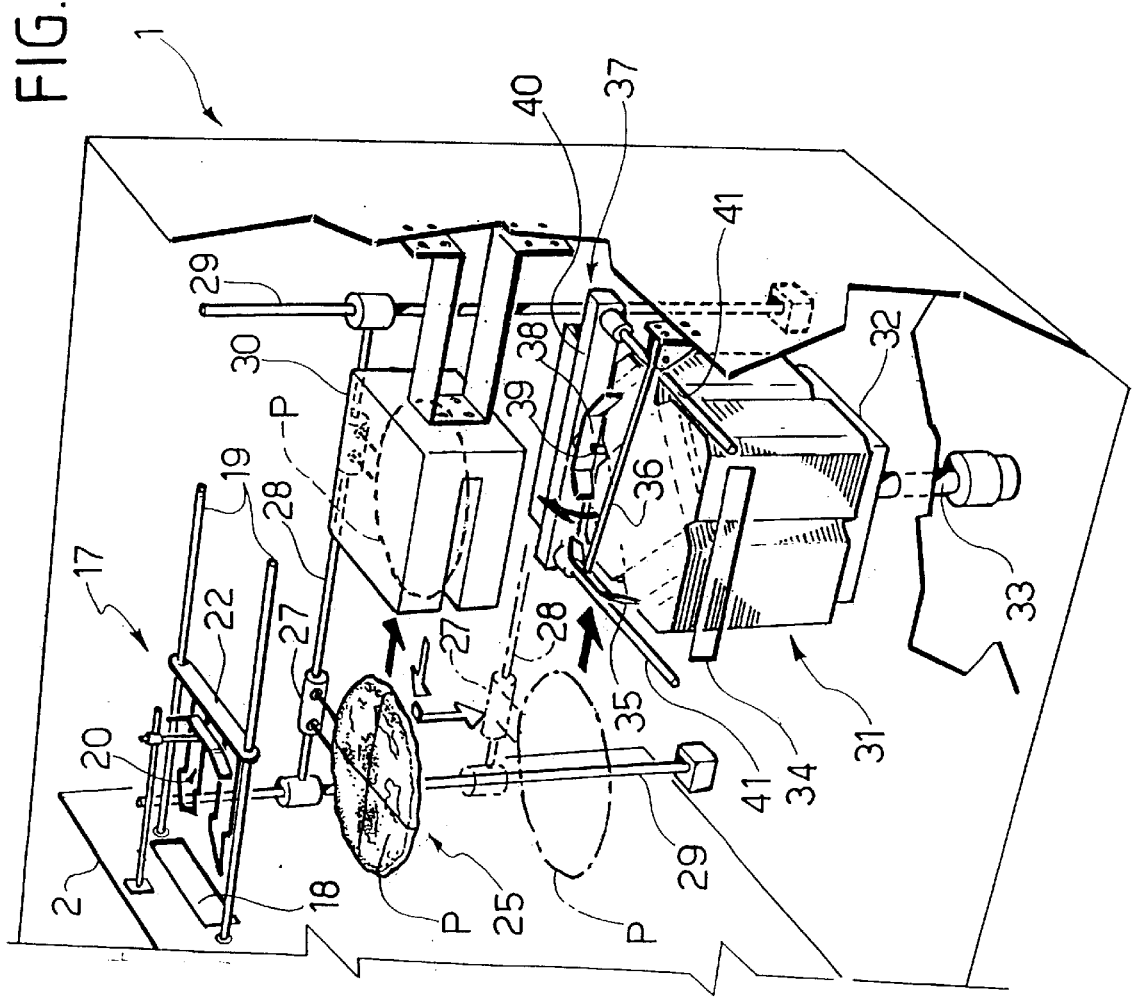

The conformation of each disposable tray T is illustrated in detail in FIG. 12. The disposable tray T consists of a plane plate of cardboard or the like, normally having a generally quadrangular shape, with a recess or notch N formed in the central area of each of its sides. In addition, each of the corners of the plate is delimited by an oblique pre-dinking line L, which joins the notches N of the sides that concur to form the said corner, and by two adjacent folding lines L1, L2 which are parallel to the pre-dinking line L.

Figure 14:
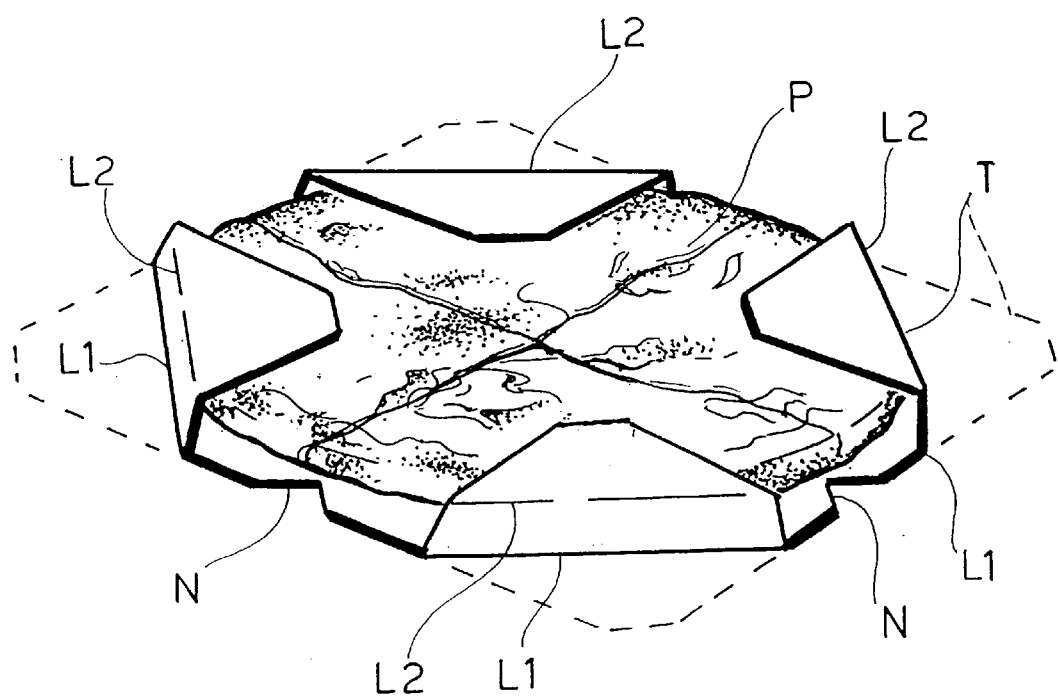
FIG. 14 is a view similar to that of FIG. 13 which shows the pizza at the end of the delivery process.
Figure 15:
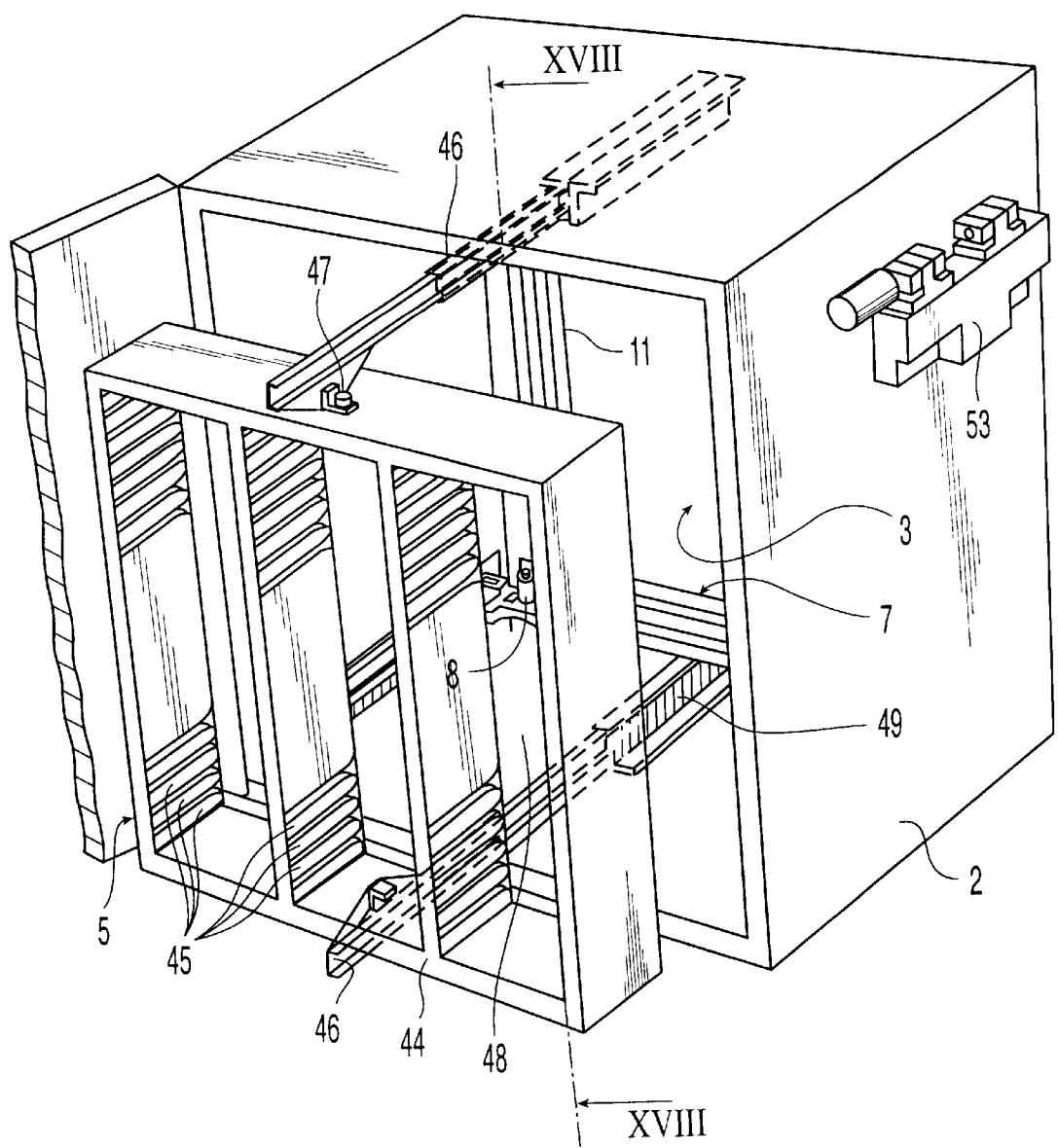
FIG. 15 is a view similar to that of FIG. 1 which shows a partial variant of FIG. 1.

The above conformation enables the user, after delivery of the pizza P, to fold the corners of the tray T in the way illustrated in FIG. 14 in order to divide the tray T into four gripping elements, by tearing along the pre-dinking lines L, corresponding to the four slices of the pizza P delimited between the corresponding diametral pre-cutting lines.

The vending apparatus according to the invention is completed by a pushbutton panel with slot-machine device or with a device for inserting/reading banknotes (not illustrated in the drawings), arranged outside the casing 1 to enable the user to select and order the pizza. For example, pizzas of different types may correspond to each column of shelves 6 of the storage unit 5, and the user can choose the pizza that he prefers on the push-button panel associated to the slot-machine device or to the device for inserting/reading banknotes. The said push-button panel is in turn connected to a control system, not illustrated in that it is within the reach of a person skilled in the branch, including a microprocessor or an electronic card system and arranged for operating the various motor-driven actuators of the components described above in a synchronized way, according to the operating cycle described in detail in what follows.

The first step consists in displacing the gripping member 8 of the pick-up assembly 7 along the horizontal guide 10 and the vertical guides 11, in such a way as to position the said gripping member 7 in front of the shelves 6 of the storage unit 5 corresponding to the pizza P selected. Next, the gripping member 8, kept in the opening position, is pushed forward along the horizontal guide 12 so as to come into a position corresponding to the pizza P, and is then closed again in the way illustrated in FIG. 3. In this way, the container E containing the pizza P is gripped tightly at the sides by the gripping member 8 along two diametrically opposite areas of the projecting rim H, whilst its bottom B rests on the bottom support 9.

At the end of this step, the gripping member 8 is brought back again along the horizontal guide 12 and is transferred, as the vertical guides 11 and horizontal guide 10 move, until the container E containing the pizza P is positioned beneath the opening assembly 13, coaxially with the axis of rotation of the latter. The said opening assembly is then activated, rotating the vertical knife 14 in contact with the lid C of the container E through an angle of slightly less than 360°. In this way, the lid C is cut away from the remaining part of the container E, but remains connected to the latter in a very small corner area. This area will be the one angularly positioned on the opposite side with respect to the communicating window 18 of the intermediate partition 2, as represented in FIG. 4.

At the end of this operation, the pizza P is taken out of the container E and is transferred from the refrigerated section 3 to the heating section 4 of the casing 1. This step is represented in FIGS. 5 and 6: the gripping member 8 of the pick-up assembly 7 is displaced horizontally until the container E is set with the lid C partially cut, as described, on top of the fixed contrast element 44. In this position, the gripping element 8 is lowered slightly, in such a way that the bottom B of the container E comes up against the contrast element 44. This causes the pizza P to come out partially from the container E as a result of the deformation and deflection upwards of the pizza P itself and of the lid C. In this step, the part of the pizza P extracted from the container E is set in a position corresponding exactly to the window 18 of the intermediate partition 2 of the casing 1.

At this point, a command is issued for advance of the transfer assembly 17 along the guides 19 of the shovel 20. The arms 21 of the said shovel 20 pass through the window 18, and their ends 23 wedge between the pizza P and the rim H of the container E in such a way that the pizza P is completely extracted from the said container E.

Next, the shovel 20 is brought back again along the guides 19, transferring the pizza P, firmly held on the arms 21 in the way represented in FIG. 6, into the heating section 4.

At the same time, the container H with its lid C is discharged, following upon opening of the gripping member 8, on the bottom of the section 3, from which it will be ejected, together with other empty containers, when the storage unit 5 is freshly supplied with pizzas through an openable door (not illustrated) of the casing 1.

The next operation consists in transferring the pizza P from the shovel 20 of the transfer unit 7 to the movable supporting grill 26. This operation, illustrated in FIGS. 7 and 8, is performed by first setting the grill 26 immediately beneath the pizza P, then lowering the movable contrast element 24 in front of the edge of the pizza P opposite to the window 18, and next bringing the shovel 20 further back in the way represented in FIG. 8. In this way, the pizza P is released from the arms 21 of the shovel 20 and is deposited on the underlying grill 26.

The pizza P is then transferred inside the heating oven by virtue of the combined movements of the grill 26 along the horizontal guide 28 and the horizontal guides 29. The pizza P remains inside the oven 30 for the entire period of time (between 1 and 2 minutes) required for it to be completely heated up. Then it is taken out of the oven 30 and transferred by the grill 26 into a position corresponding to the delivery assembly 37.

Figure 10:
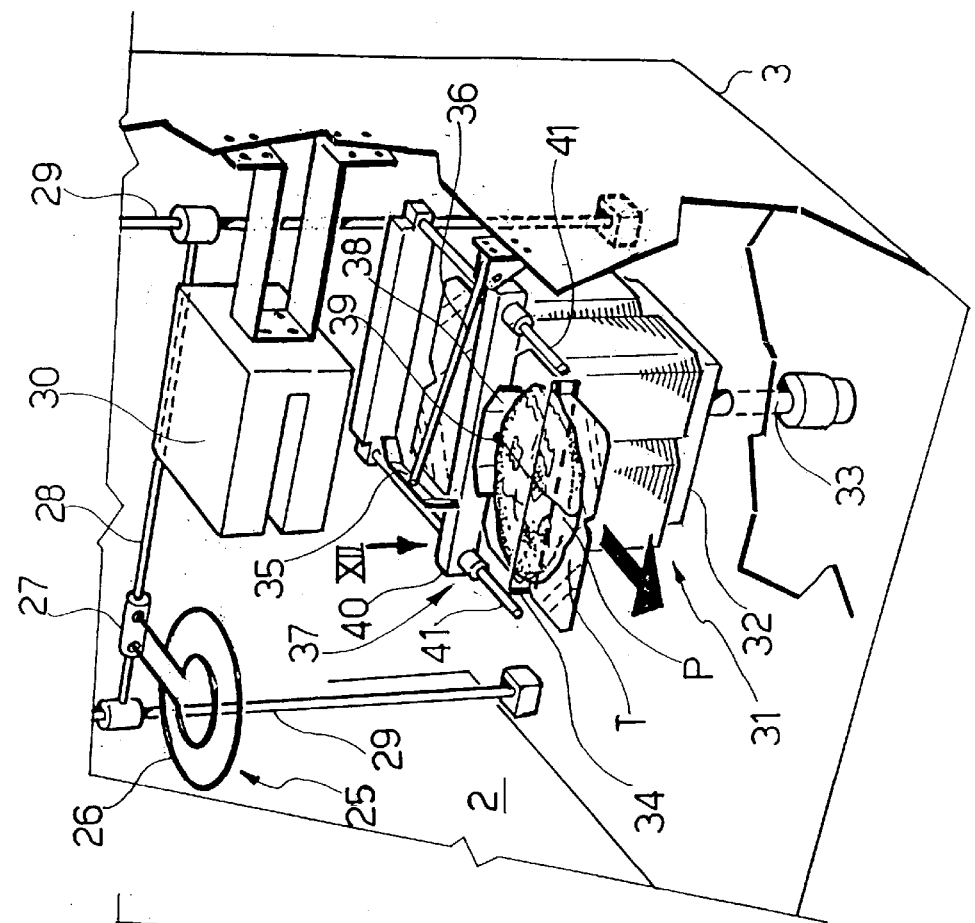
Figure 11:
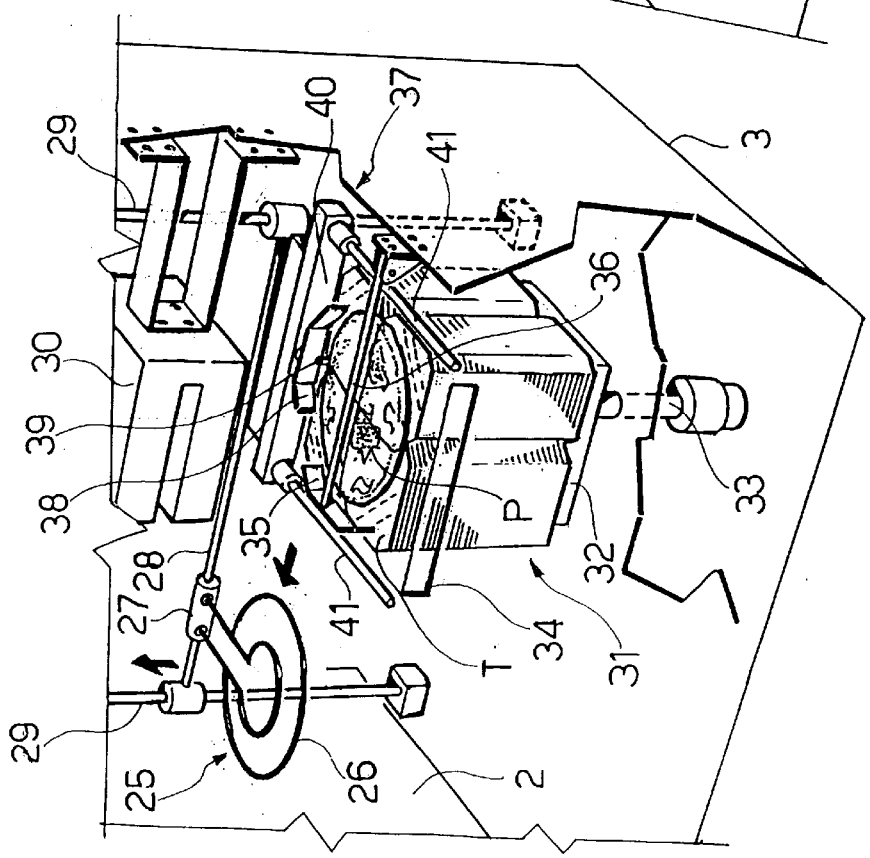

As represented in FIG. 10, with the cross member 40 (carrying the pusher 38 and the pushing member 39) set in a retracted position, and the oscillating contrast element 35 set in a raised position by means of the corresponding rod 36, the pizza P is positioned immediately above the tray T that is located at the top of the magazine 31. Then the movable contrast element 35 is lowered so as to be set in a position adjacent to the edge of the pizza P that faces the intermediate partition 2, and the grill 26 is brought back along the guide 28, as represented in FIG. 10. As a result of these operations, the pizza P is released from the grill 26 and is deposited on the tray T that is set at the top of the magazine 31. The contrast element 35 is then raised again.

Next, the delivery device 37 is activated so as to feed the cross member 40 in the direction of the delivery opening 34. In this step, the pusher 38 acts on the edge area of the pizza P opposite to the delivery opening 34, whilst the pushing member 39 interacts with the corresponding notch N of the tray T. In practice this brings about a separation of the tray T from the one underneath and a pushing action, exerted both on the tray T and on the pizza P, until they come out together completely through the delivery opening 34.

The user can now turn up the corners of the tray T in the way described previously and proceed to separating and then consuming the four slices of the pizza P.

From the foregoing description it emerges clearly that the vending apparatus according to the invention enables supply, in extremely short periods of time, of hot pizzas the quality of which is not inferior to that of a pizza made in a traditional pizzeria, but at an appreciably lower cost.

Another embodiment of the invention, currently considered the preferred one, will now be described with reference to FIGS. 15–24 of the drawings. In these figures, the parts that are identical or similar to those already described with reference to FIGS. 1–14 are designated by the same reference numbers, and only the differences will be described in detail.

These differences basically regard the refrigerated section 3 of the casing 1, with particular reference to the storage units 5, the pick-up assembly 7, and the transfer assembly 17.

In the present case, the storage unit 5 is made up of a sturdy framework 44 bearing three (or more) columns, set side by side, of pairs of horizontal guides 45 set on top of one another for introducing, retaining and removing the pizzas P inserted in the sealed containers E.

Figure 16:
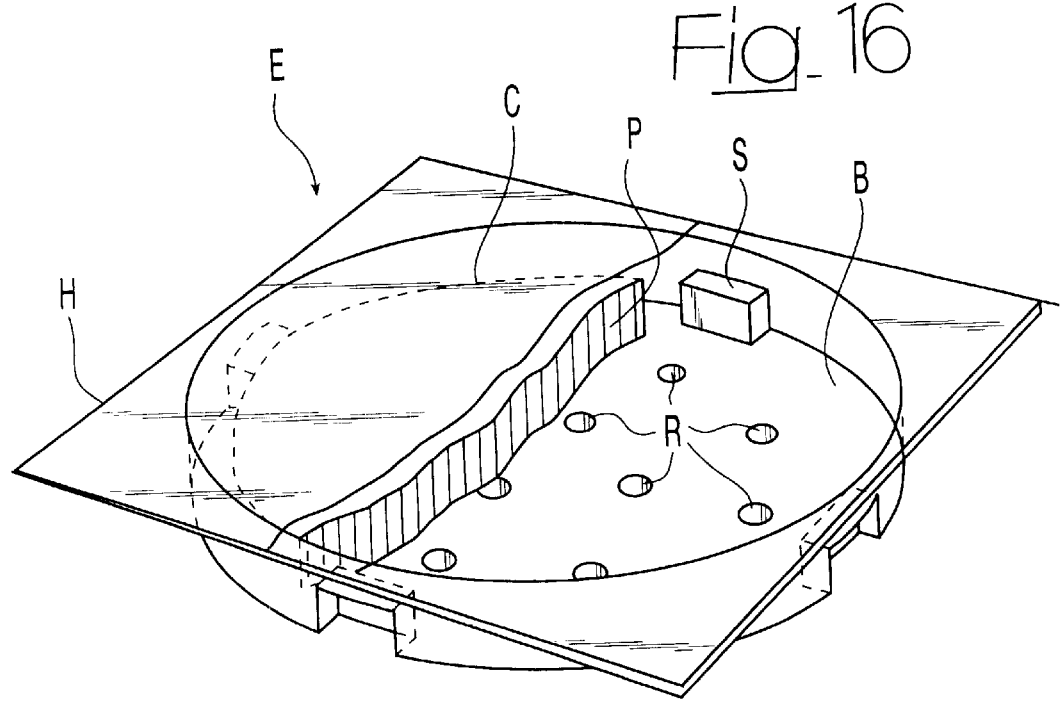
FIG. 16 is a perspective and partially interrupted view which shows the pizza as it is packaged at the start of the delivery process, with the dispensing apparatus according to the variant of FIG. 15.
Figure 21:
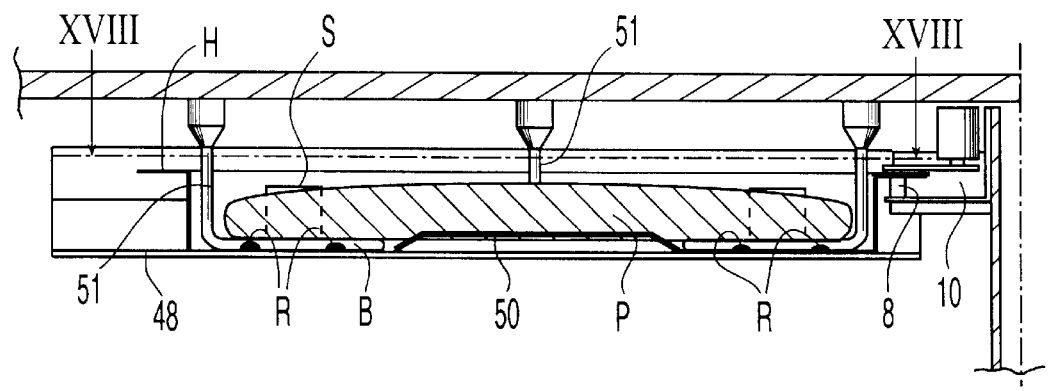
Figure 22:
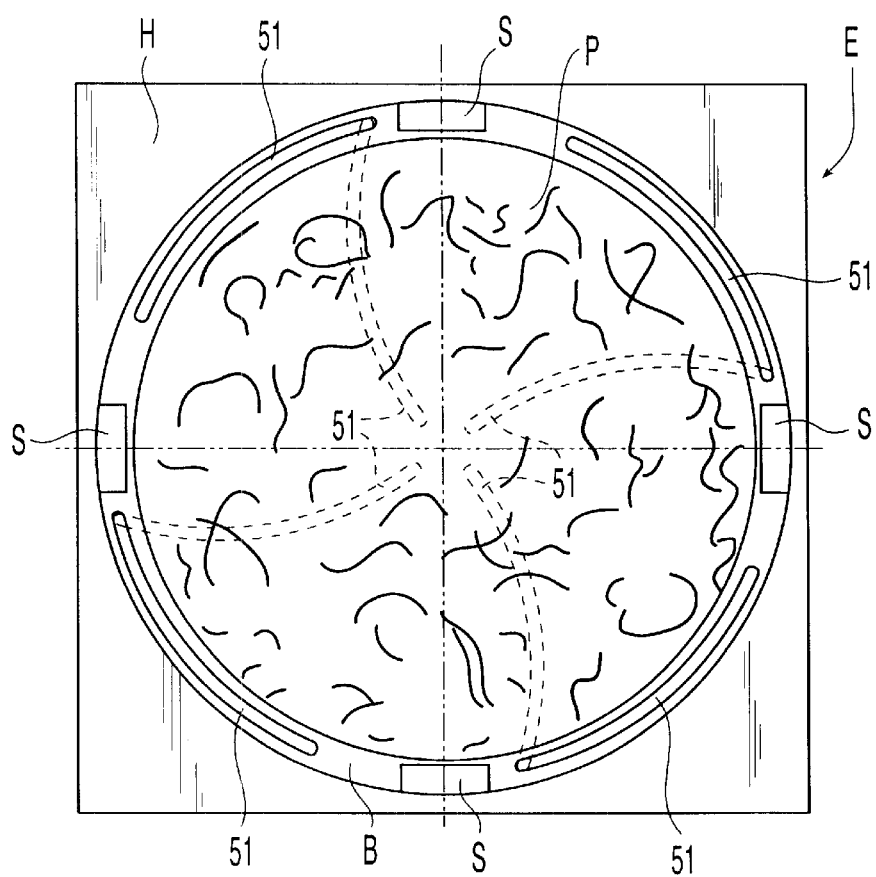
FIG. 22 is horizontal cross-sectional view according to the line XXII—XXII of FIG. 21.

With the above arrangement, the sealed containers E have the conformation represented in FIG. 16. The general shape is still that of a circular tray with a bottom B, a lid C and a projecting rim H, which, however, in this case has a roughly quadrangular conformation. Two opposite sides of the said quadrangular rim H are designed to be inserted within the pair of guides 45. In addition, the bottom B is formed with vertical spacing projections R, for example hemispherical in shape, as well as with side spacing projections S consisting of protruding parts of the side wall W of the circular tray. The side spacing projections S are, for example, four in number, set at equal angular distances apart.

The function of the vertical spacing projections R and the side ones S will be clarified in what follows.

The structure 44 of the storage unit 5 is supported inside the refrigerated section 3 by means of a pair of telescopically extendible arms 46 in such a way that the said structure 44 can be easily pulled out for replacement of the empty containers E and their replacement with new containers E containing the pizzas P, and then again re-introduced into the refrigerated section 3. To facilitate these operations further, the structure 44 is conveniently connected to the extendible arms 46 in such a way that it can turn about a central vertical axis 47.

Figure 18:
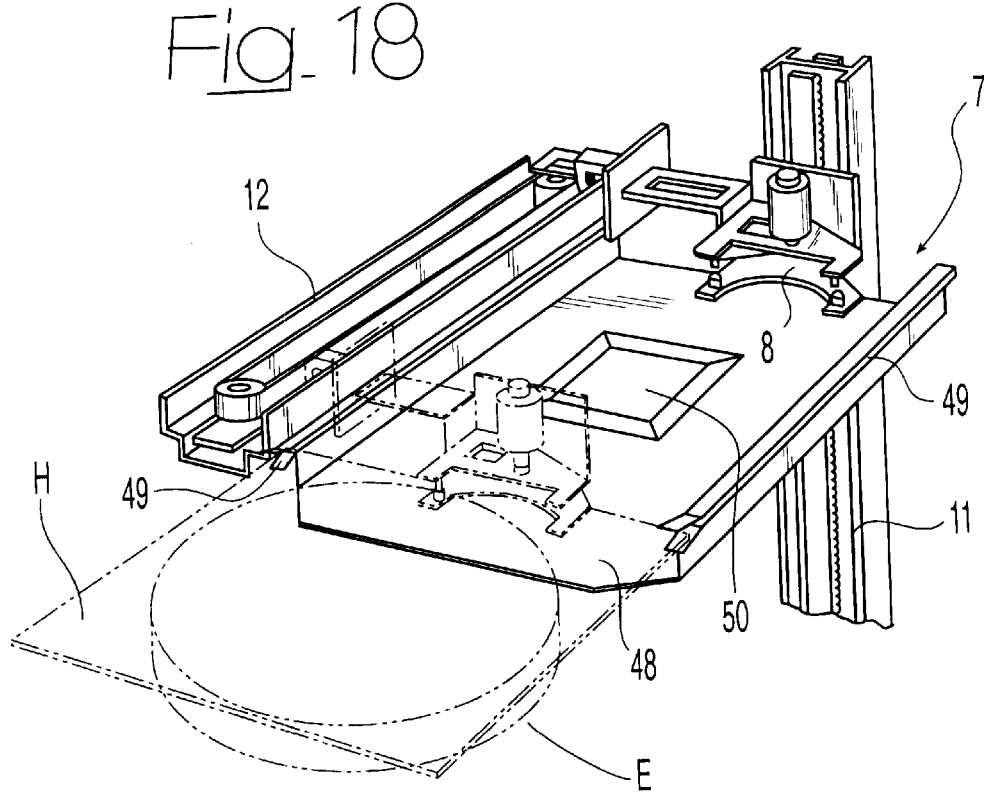
FIG. 18 is a perspective view of one part of FIG. 17.

With reference now in greater detail to FIGS. 17 and 18, the pick-up assembly 7 differs from the one described previously essentially in that it moreover includes a tray support 48 above which the gripping member 8 can move horizontally with an alternating motion. The tray support 48 is provided, at its sides, with guides 49 for gripping the opposite sides of the projecting rim H of the container E, and with a projecting area 50 at its centre.

In operation, the tray support 48 is positioned, moving together with the gripping member 8, along the horizontal guide 10 and the vertical guide 11 to set itself in front of the pair of guides 45 of the storage unit 5 corresponding to the pizza P selected. Next, the gripping member 8, held in the opening position, is fed forwards along the horizontal guide 12 to perform gripping of the front side of the projecting rim H of the container E. The gripping member 8, which is then closed on the said front side, moves back, sliding out the sides of the projecting rim H of the container E from the guides 45, then causing them to slide so that they engage with the side guides 49. The container E thus slides against the tray support 48, interacting with the projecting part 50. This interaction produces, as may be clearly seen from FIG. 20, an arching of the bottom B and of the pizza P, and consequently a tensioning of the lid C. This tensioning enables, when the container E with the pizza P is positioned underneath the opening assembly 13, cutting of the lid C in an fully reliable way, as described previously.

Another important difference between the variant currently described and the embodiment illustrated in FIGS. 1–14 lies in the conformation of the transfer assembly 17. This assembly comprises a set of (in the example illustrated, four) gripping arms 51, which are roughly L-shaped and which can rotate and possibly, but not necessarily, be displaced vertically. As illustrated in detail in FIGS. 21, 22 and 23, when the container E, following on cutting of the lid C performed by the assembly 13, comes to occupy a position corresponding to the transfer assembly 17, the gripping arms 51 insert, from above, between the side spacing projections S, and are then made to rotate underneath the pizza P owing to the presence of the vertical projections R. Of course, insertion from above may be performed by raising the container E instead of by lowering the gripping arms 51.

Following upon rotation of the arms 51, the pick-up assembly 7 is lowered and moved away so that the pizza P remains simply supported by the horizontal branches of the said arms 51, in the way represented in FIG. 23.

A further simplification of the transfer assembly 17 with respect to the embodiment described previously lies in the fact that, in practice, the pizza shovel 20 and the movable supporting device 25, including the grill 26, are replaced by a simple shovel 52 that can be displaced through the window 18 between a position in which the pizza P is received by the arms 51 when the latter are rotated in the position of releasing the pizza P starting from the position represented in FIG. 23 and a position of delivery of the pizza P inside the heating section 4 according to the modalities described previously with reference to the grill 26.

The openable communicating door which controls opening/closing of the window 18 is designated by the reference number 53.

Of course, the details of construction and the embodiments may vary widely with respect to what is described and illustrated herein, without thereby departing from the scope of the present invention as defined in the ensuing claims.

What is claimed is:

1. A vending apparatus for dispensing hot pizzas (P), comprising a casing (1) divided into a refrigerated section (3) and a heating section (4), separated from and intercommunicating with each other, wherein said refrigerated section (3) includes:

a storage unit (5) designed for containing a plurality of pre-cooked pizzas (P), each of which is packaged in a respective sealed container (E);

pick-up means (7) for removing one pizza at a time from said storage unit (5) by gripping the corresponding container (E) peripherally;

opening means (13) to open the container (E); and transfer means (17) for taking the pizza (P) out of the container (E), and wherein said heating section includes:

an electric oven (30);

a magazine (31) of stacked disposable trays (T);

movable supporting means (25) designed for receiving the pizza (P) from said transfer means (17), transferring it to the heating section and introducing it into the oven (30), and for then depositing the hot pizza on the tray (T) located on the top of the tray magazine (31); and delivery means (37) for transferring the pizza (P) onto the corresponding tray (T) outside said casing (1);

motor-driven actuator means and control means, which can be actuated from outside the casing (1), being provided for controlling said pick-up means (7), said opening means (13), said transfer means (17), said movable supporting means (25), and said delivery means (37) synchronously according to a pre-set automatic cycle.

2. A vending apparatus according to claim 1, wherein said pick-up means (7) include an openable and closeable gripping member (8) which can be displaced horizontally according to two mutually orthogonal directions (10, 12), and vertically (11), with respect to said storage unit.

3. A vending apparatus according to claim 2, wherein said pick-up means (7) further include a tray support (48) above which said gripping member (8) can move in an alternating manner, said tray support (48) being provided with means for lateral tensioning (59, 50) of said sealed container (E).

4. A vending apparatus according to claim 3, wherein said storage unit (5) includes a structure (44) bearing columns, set side by side, of pairs of horizontal guides (45) set on top of one another for providing slideable support of the pizzas (P) inside said sealed containers (E), said structure (44) being extractable from said refrigerated section (3) of said casing (1) and being mounted in such a way that it can turn about a vertical axis.

5. A vending apparatus according to claim 1, wherein said opening means (13) include a knife member (14) rotating about a vertical axis and designed for cutting said container (E) at the top thereof along a circular cutting line describing an angle that is slightly smaller than that of the entire perimeter of said container (E).

6. A vending apparatus according to claim 1, wherein an obstructable intercommunication passage (18) is provided between said refrigerated section (3) and said heating section (4).

7. A vending apparatus according to claim 4, wherein provided inside said refrigerated section (3) is, in the proximity of said intercommunication passage (18), a fixed contrast element (44) co-operating with said transfer means (17) for taking out the pizza (P) from the corresponding container (E), and in that said transfer means (17) include a shovel (20) which can move in a horizontal direction (19) between a position of gripping of the pizza (P), in which said shovel (20) is positioned inside said refrigerated section (3) above said fixed contrast element (44), and a depositing position, in which said shovel (20) is positioned inside said heating section (4) above said movable supporting means (25); a vertically movable contrast element (24) being operatively associated to said shovel (20), and the latter being horizontally displaceable with respect to said contrast element (24).

8. A vending apparatus according to claim 1, wherein said transfer means (17) include gripping arms (51) which may be inserted from above inside said container (E) and can turn for engaging the pizza (P) from beneath, and said movable supporting means include a shovel (20) which can move between a position in which it receives the pizza (P) from said gripping arms (51) inside said refrigerated section (3), and a delivery position in which the pizza (P) is delivered inside said heating section (4).

9. A vending apparatus according to claim 7, wherein said movable supporting means (25) include a grill support (26) which is displaceable both horizontally (28) and vertically (29).

10. A vending apparatus according to claim 1, wherein said magazine (31) of disposable trays (T) includes a movable contrast element (35) co-operating with said supporting means (25), and a supporting base (32) which carries a pile of said disposable trays (T) and can be raised in such a way as to position the top of said pile of disposable trays (T) immediately beneath said movable contrast element (35).

11. A vending apparatus according to claim 1, wherein each pizza (P) inside the corresponding sealed container (E) is partially pre-cut according to two diametral lines that are mutually orthogonal.

12. A vending apparatus according to claim 10, wherein each of said disposable trays (T) consists of a plate of cardboard or of a similar material with a substantially quadrangular profile, the corners of which are each delimited by an oblique pre-dinking line (L) and by two folding lines (L1, L2) which are adjacent and parallel to said pre-dinking line (L).

13. A vending apparatus according to claim 12, wherein said plate (T) is formed with a recess or notch (N) at a point corresponding to the median area of each one of its sides.

14. A vending apparatus according to claim 13, wherein said delivery means (37) include a pusher-separator assembly (38, 39, 40) movable with alternating rectilinear motion above the top of said magazine (31) of disposable trays (T), in a position corresponding to an output mouth (34) of said casing.

15. A vending apparatus according to claim 14, wherein said pusher-separator assembly includes a first pusher (38) designed to interact with the edge of the pizza (P) and a second pusher (39) designed to interact with the corresponding one of said notches (N) of the disposable tray (T).

16. A vending apparatus according to claim 1, wherein said oven (30) is an IR microwave oven.

17. A vending process for automated dispensing of hot pizzas (P) comprising the following operations:

providing a casing (1) divided into a refrigerated section (3) and a heating section (4) which are separate from one another and intercommunicating;

providing, in said refrigerated section (3), a storage unit (5) containing a plurality of pre-cooked pizzas (P), each of which is packaged inside a corresponding sealed container (E), and providing, in said heating section (4), an electric oven (30) and a magazine (31) of disposable trays (T) stacked on top of one another;

removing one pizza at a time from said storage unit (5) by gripping the corresponding container (E) peripherally;

opening said container (E) by cutting it from above and taking the pizza (P) out of its container (E);

transferring the pizza (P) to the heating section and introducing it into said oven (30);

depositing the hot pizza on the tray (T) that is set on the top of said magazine (31) of trays; and transferring the pizza (P) in the corresponding tray (T) outside said casing (1).

* * * * *